K. PEISELER.
ELECTRICALLY WELDED TUBING AND PROCESS OF MAKING THE SAME.
APPLICATION FILED OCT. 24, 1914.
1,154,933.  Patented Sept. 28, 1915.
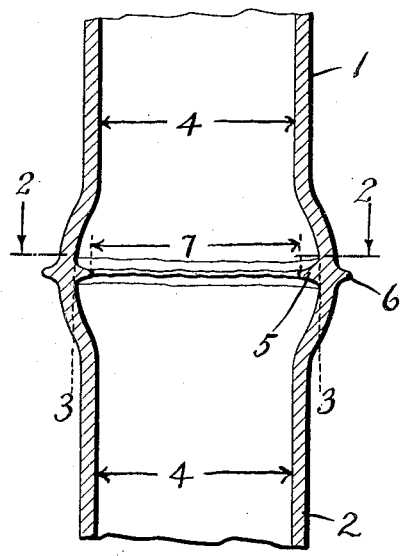
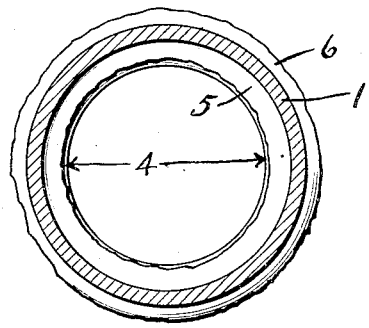
INVENTOR
Kuno Peiseler

UNITED STATES PATENT OFFICE.

KUNO PEISELER, OF PREUSSEN, GERMANY, ASSIGNOR TO THOMSON ELECTRIC WELDING COMPANY, OF LYNN, MASSACHUSETTS, A CORPORATION OF MASSACHUSETTS.

ELECTRICALLY-WELDED TUBING AND PROCESS OF MAKING THE SAME.

1,154,933.   Specification of Letters Patent.   Patented Sept. 28, 1915.

Application filed October 24, 1914. Serial No. 868,493.

*To all whom it may concern:*

Be it known that I, KUNO PEISELER, a subject of the Emperor of Germany, and a resident of Preussen, Germany, have invented certain new and useful Improvements in Electrically-Welded Tubing and Processes of Making the Same, of which the following is a specification.

This invention relates to the manufacture of pipe or tubing wherein the ends of lengths of pipe or tubes are electrically butt welded together to form the desired length.

The object of the invention is to cheapen the cost of the finished product by avoiding the necessity of removing the bur formed on the inside of the pipe by the welding operation.

Electric welding of the ends of pipes or tubes is particularly advantageous when small size pipes are employed or when very long lengths are desired such as pipe coils &c. but the electric welding has the disadvantage that a bur is formed on the inside of the pipe due to the heavy up-setting pressure necessarily used in the welding operation, which bur must be removed or the effective diameter of the pipe will be materially reduced. To remove the bur is expensive to such an extent that it is in many cases prohibitive.

According to this invention it is not necessary to remove the bur and still the desired effective diameter of the pipe is maintained throughout its length.

The invention consists in the improved electrically welded pipe or tube and in the process of making the same hereinafter more particularly described and then specified in the claims.

In the accompanying drawings, Figure 1 illustrates in longitudinal section two pieces of pipe joined together in accordance with this invention. Fig. 2 is a transverse cross-section of the same taken on the line 2—2 of Fig. 1.

1 and 2 indicate two sections of pipe or tube the ends of which are to be welded together and in the case illustrated the interior diameter of both sections is the same and in accordance with the desired diameter of the completed pipe.

Preferably before the welding operation the abutting ends of the sections to be joined are expanded to such an extent that the diameter across the bur formed when the sections are welded will be at least as great as or greater than the diameter of the pipe sections proper.

In the drawings the inside diameter of the expanded ends is indicated at 3, 3 and the normal diameter of the sections is indicated at 4.

After the ends of the sections 1 and 2 have been expanded they are butted together and an electric current is passed from one to the other and at the same time pressure is applied longitudinally of the pipe. As the current passes through the abutted ends the work softens and pressure being applied they are forced together and coalesce with each other at the same time forcing out metal and forming a bur 5 on the inside of the pipe as well as a bur 6 on the outside. The bur 5 however, owing to the expansion of the pipe ends does not protrude into the pipe farther than the normal diameter 4, the diameter at the bur in the case illustrated being indicated at 7. Thus without the necessity of removing the bur 5 the effective diameter 4 of the pipe is maintained. The outer bur 6 may or may not be removed as desired. To remove it is a simple grinding or rolling operation.

What I claim as my invention is:—

1. The process of electrically welding pipe or tube sections consisting in expanding the abutting ends of the sections, passing an electric heating current from one section to the other across the abutting ends and applying pressure longitudinally thereof to weld the sections together, whereby the bur on the inside of the pipe at the joint will not protrude beyond the diameter of the pipe sections.

2. Electrically welded pipe or tubing having sections butt welded to each other and expanded at the welded ends whereby the diameter at the bur on the inside of the pipe will be at least equal to the inside diameter of the pipe sections.

3. An electrically welded pipe or tube comprising a plurality of pipe or tube sections butt-welded together at their ends, said ends being expanded whereby the bur on the inside of the pipe will not protrude beyond the line of the diameter of the pipe or tube sections.

Signed at Berlin, Germany, this 5th day of January, A. D. 1915.

KUNO PEISELER.

Witnesses:
   HENRY HASPER,
   WOLDEMAR HAUPT.